United States Patent
Westberg et al.

(10) Patent No.: US 10,805,268 B2
(45) Date of Patent: Oct. 13, 2020

(54) METHOD AND APPARATUSES FOR ENABLING ROUTING OF DATA PACKETS BETWEEN A WIRELESS DEVICE AND A SERVICE PROVIDER BASED IN THE LOCAL SERVICE CLOUD

(71) Applicant: Telefonaktiebolaget LM Ericsson (publ), Stockholm (SE)

(72) Inventors: Lars Westberg, Enköping (SE); Johan Rune, Lidingö (SE); Vinay Yadhav, Upplands Väsby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/661,001

(22) Filed: Oct. 23, 2019

(65) Prior Publication Data
US 2020/0169533 A1    May 28, 2020

Related U.S. Application Data

(63) Continuation of application No. 15/508,388, filed as application No. PCT/SE2014/051021 on Sep. 4, 2014, now abandoned.

(51) Int. Cl.
*H04L 29/06* (2006.01)
*G06F 9/455* (2018.01)
(Continued)

(52) U.S. Cl.
CPC ...... *H04L 63/0245* (2013.01); *G06F 9/45504* (2013.01); *H04L 61/1511* (2013.01);
(Continued)

(58) Field of Classification Search
CPC ............. H04L 63/0245; H04L 63/0272; H04L 61/6013; H04L 61/1511; H04L 63/0236;
(Continued)

(56) References Cited

U.S. PATENT DOCUMENTS

| 8,462,696 B2 | 6/2013 | Vesterinen et al. |
| 8,607,074 B2 | 12/2013 | Di Luoffo et al. |

(Continued)

FOREIGN PATENT DOCUMENTS

| CN | 103281406 A | 9/2013 |
| WO | 2012160465 A1 | 11/2012 |

(Continued)

OTHER PUBLICATIONS

Rawadi, Jeanmarc, et al., "Providing Local Cloud Services to Mobile Devices with Inter-cloudlet Communication", 17th IEEE Mediterranean Electrotechnical Conference (MELECON), Beirut, Lebanon, Apr. 13-16, 2014, pp. 1-5.

*Primary Examiner* — Tonia L Dollinger
*Assistant Examiner* — Mehulkumar J Shah
(74) *Attorney, Agent, or Firm* — Murphy, Bilak & Homiller, PLLC

(57) ABSTRACT

There is provided a method for constructing a traffic filter enabling routing of data between a wireless device and a Local Service Cloud, LSC, based service provider and a corresponding system, computer program and computer program carrier. There is also provided a method for enabling routing of data packets between a wireless device in a cellular communication network and a Local Service Cloud, LSC, based service provider, a method for routing data packets between a wireless device in a cellular communication network and a Local Service Cloud, LSC, based service provider and corresponding network nodes.

16 Claims, 11 Drawing Sheets

(51) Int. Cl.
*H04W 40/20* (2009.01)
*H04L 29/12* (2006.01)
*H04L 29/08* (2006.01)

(52) U.S. Cl.
CPC ...... *H04L 61/6013* (2013.01); *H04L 63/0236* (2013.01); *H04L 63/0272* (2013.01); *H04L 67/1002* (2013.01); *H04L 67/16* (2013.01); *H04L 67/327* (2013.01); *H04W 40/20* (2013.01); *G06F 2009/4557* (2013.01); *G06F 2009/45562* (2013.01); *G06F 2009/45595* (2013.01)

(58) Field of Classification Search
CPC ... H04L 67/16; H04L 67/1002; H04L 67/327; H04L 29/06; H04L 29/12; H04L 29/08; H04L 43/0876; H04L 41/0823; H04L 43/08; H04L 63/1408; H04L 47/20; H04L 47/2441; H04L 67/1004; H04L 67/101; H04L 67/322; G06F 9/455; G06F 9/45504; G06F 2009/45562; G06F 2009/45595; G06F 2009/4557; H04W 40/20
USPC .............. 709/226; 718/1; 712/229; 710/36; 711/150; 726/36
See application file for complete search history.

(56) References Cited

U.S. PATENT DOCUMENTS

| | | |
|---|---|---|
| 8,724,509 B2 | 5/2014 | Cheng et al. |
| 2007/0088822 A1 | 4/2007 | Coile et al. |
| 2008/0005293 A1 | 1/2008 | Bhargava et al. |
| 2011/0069659 A1 | 3/2011 | Kong et al. |
| 2011/0176531 A1* | 7/2011 | Rune ............... H04W 76/22 370/338 |
| 2011/0235595 A1 | 9/2011 | Mehta et al. |
| 2012/0093074 A1 | 4/2012 | Sairanen et al. |
| 2012/0182940 A1 | 7/2012 | Taleb et al. |
| 2013/0066936 A1 | 3/2013 | Krishnan et al. |
| 2013/0121207 A1 | 5/2013 | Parker |
| 2013/0124712 A1 | 5/2013 | Parker |
| 2013/0165177 A1 | 6/2013 | Berg et al. |
| 2013/0227558 A1* | 8/2013 | Du ............... H04L 67/18 718/1 |
| 2013/0268357 A1 | 10/2013 | Heath |
| 2013/0279336 A1 | 10/2013 | Woelker et al. |
| 2013/0294335 A1 | 11/2013 | Suni et al. |
| 2013/0297729 A1* | 11/2013 | Suni ............... G06F 21/629 709/217 |
| 2014/0059226 A1 | 2/2014 | Messerli et al. |
| 2015/0063166 A1 | 3/2015 | Sif et al. |
| 2015/0120909 A1* | 4/2015 | Karthikeyan ....... H04L 61/1511 709/224 |
| 2015/0195178 A1 | 7/2015 | Bhattacharya et al. |

FOREIGN PATENT DOCUMENTS

| | | |
|---|---|---|
| WO | 2013144747 A1 | 10/2013 |
| WO | 2013164403 A1 | 11/2013 |
| WO | 2014003872 A1 | 1/2014 |
| WO | 2014014823 A1 | 1/2014 |

* cited by examiner

FIG. 7A
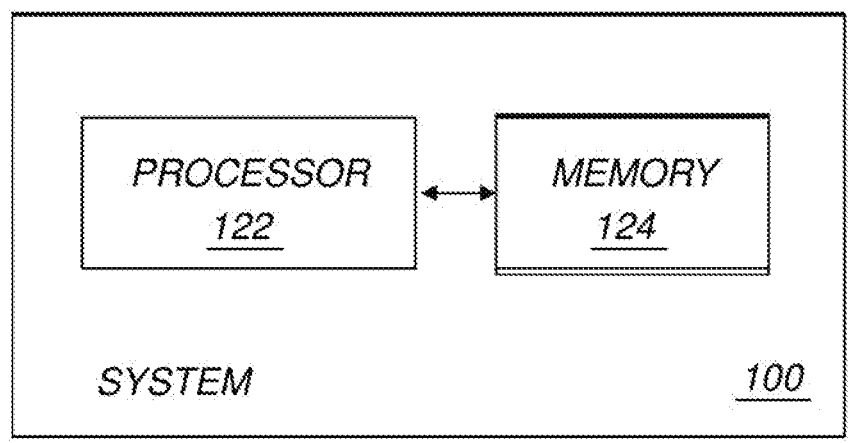
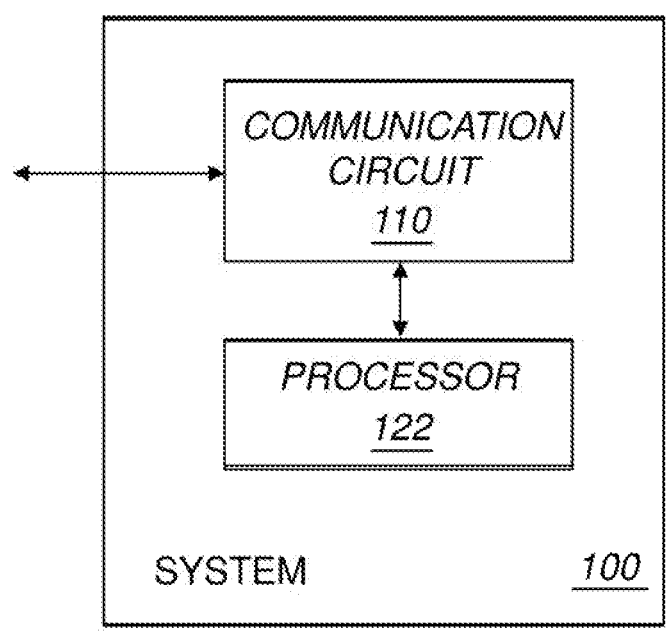
FIG. 7B

FIG. 8A
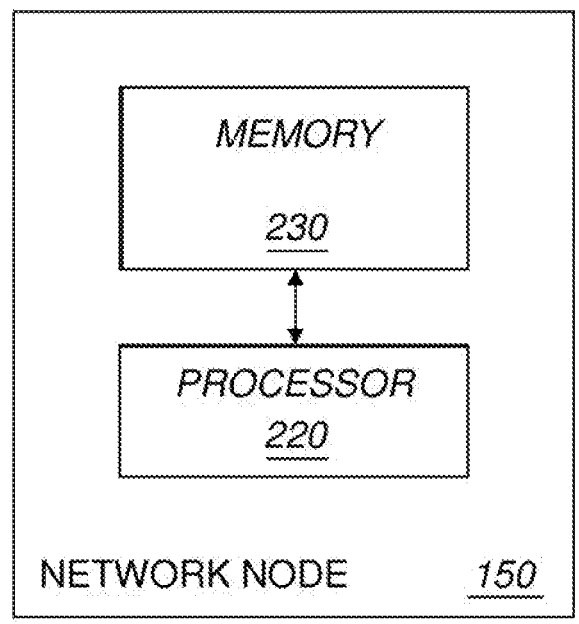
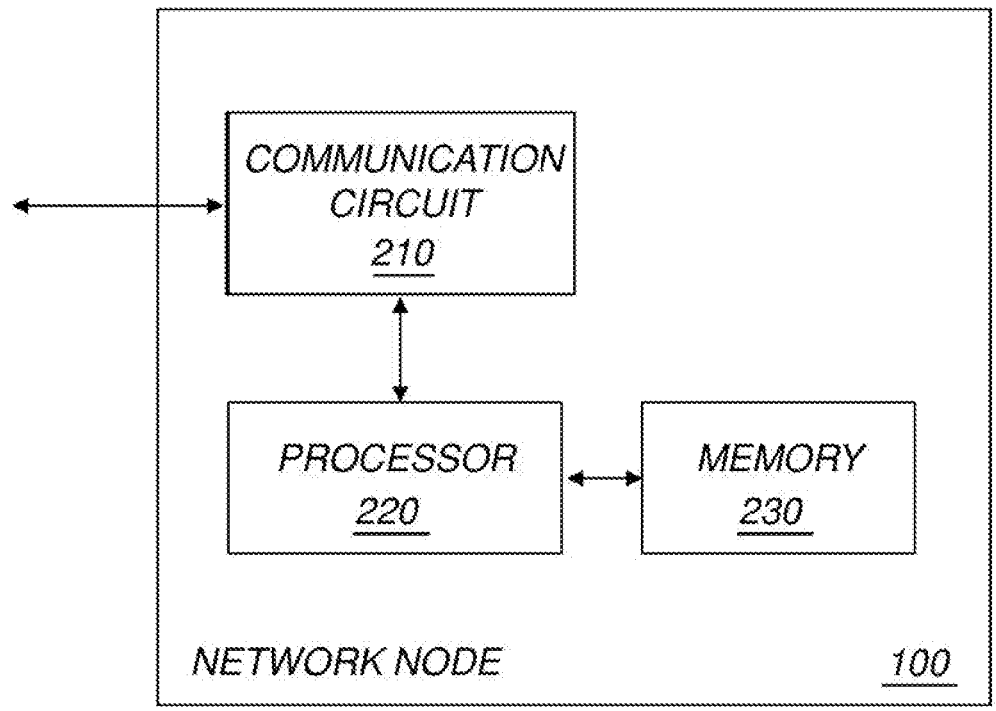
FIG. 8B

METHOD AND APPARATUSES FOR ENABLING ROUTING OF DATA PACKETS BETWEEN A WIRELESS DEVICE AND A SERVICE PROVIDER BASED IN THE LOCAL SERVICE CLOUD

RELATED APPLICATIONS

This application is a continuation of U.S. application Ser. No. 15/508,388 filed 2 Mar. 2017, which is a U.S. National Phase Application of PCT/SE2014/051021 filed 4 Sep. 2014. The entire contents of each aforementioned application is incorporated herein by reference.

TECHNICAL FIELD

The proposed technology generally relates to a method for constructing a traffic filter enabling routing of data packets between a wireless device and a Local Service Cloud, LSC, based service provider and a corresponding system, computer program and computer program carrier. It also relates to a method for enabling routing of data packets between a wireless device in a cellular communication network and a Local Service Cloud, LSC, based service provider and a corresponding network node. The proposed technology also relates to a method for routing data packets between a wireless device in a cellular communication network and a Local Service Cloud, LSC, based service provider and a corresponding network node.

BACKGROUND

An expectation within the field of network technology is that cloud based service delivery will be important for future service providers. In the future therefore, it is expected that a lot of client services will be provided in one way or the other by the cloud. Many of the currently known and applied cloud technologies are based on orchestration functions as a way to manage the cloud functionality.

The currently utilized approaches are mainly geared towards using statically provided filter rules that are configured by cloud management, i.e., orchestration. The rules, or policies, are set statically and as such cannot adapt to such cases as when a wireless device have downloaded a new application and want to have it processed by the cloud.

A number of approaches has been suggested for managing cloud functionalities. In US 20120093074 A1, there is disclosed a User Equipment, UE, where context, including a session context for a breakout data session, is stored in a local memory. The session context comprises a source internet protocol address, IP address, a destination IP address, an identifier of a former local breakout gateway LBGW and an identifier of a new LBGW.

In US 2011/0069659 A1 there is disclosed a method and an apparatus for providing a Local Break-Out service, LBO service, in a wireless communication system.

In WO 2014014823 A1 there is disclosed a system for controlling local breakout using a policy infrastructure. The system includes a Policy and Changing Rules Function, PCRF, configured to receive an admission request associated with a subscriber from an eNodeB and, in response to the admission request, to install a subscriber-specific policy on the eNodeB for implementing local breakout at the eNode B for the subscriber.

In U.S. Pat. No. 8,724,509 B2 there is disclosed a method for local IP-access without affecting the access to the operator's core network. The method might be applied in a corporate network provided with multiple home NodeBs or eNodeBs. The disclosed method deals with local IP-access.

In U.S. Pat. No. 8,462,696 B2 there is provided a mobile terminal that is configured to detect the availability of a local break-out service to an Internet Protocol gateway GW, and to initiate a network entry to the local break-out service and to configure an Internet protocol stack in the mobile terminal based on the received configuration data. The purpose is to configure the client by using DHCP as the protocol. This is required in a home GW environment where the Client is trying to access the home resources. The disclosed technology is based on the local IP-address and access is determined on the basis of the IP-address.

In certain mobile systems, there are solutions for end-user based policies. These policy rules are set by the operator in the PCRF. The policies are set to dynamically configure the PDN-GW, PDN-Gate Way, either when a Client, such as a User Equipment, UE, connects to the network or when a QoS-bearer is activated. Other solutions for home basestations are dealing with local-break-out of traffic to the local home-GW.

Further approaches can be found in Refs [1]-[8].

SUMMARY

The proposed technology aims to provide alternative mechanisms for managing or controlling cloud functionalities. These mechanisms provide for an efficient routing of data packets between a wireless device served by the functionalities of the cloud and the cloud.

To enable a satisfactory service provided by the functionality of the cloud, the activation of cloud services should preferably be able to incorporate the particular demands from the wireless device requesting the services. The service should in particular be able to cope with the dynamics of the specific application chosen by the user of the wireless device, and thus to be able to provide a routing of data packets to and from cloud based services based on the particular demands of the wireless device. It would in particular be a preferable feature if the data traffic between the wireless device and the cloud services was more dynamical and tailored to the specific application.

The proposed technology aims to provide mechanisms or functionalities that enables an efficient routing of data packets between a wireless device served by a service provider in a Local Service Cloud, LSC, and the LSC.

It is an object of the proposed technology to provide methods for constructing a traffic filter that enables a routing of data packets between a service provider based in a Local Service Cloud, LSC, and a wireless device that is requesting an application to be processed by the LSC.

It is a specific object to provide a method that enables routing of data packets between a wireless device in a cellular communication network and a Local Service Cloud, LSC, based service provider.

It is another specific object to provide a method performed by a network node serving the wireless device in the cellular communication network for routing data packets between a wireless device in a cellular communication network and a Local Service Cloud, LSC, based service provider.

Yet another specific object of the proposed technology is to provide a system for constructing a traffic filter that enables a routing of data packets between a service provider hosted in a Local Service Cloud, LSC, and a wireless device that is requesting an application to be processed by the LSC.

Still another specific object of the proposed technology is to provide a network node configured for routing data packets between a wireless device in a cellular communication network and a Local Service Cloud, LSC, based service provider.

Yet another object is to provide a traffic filter that enables routing of data packets between a wireless device and a LSC based service provider.

Yet another a specific object is to provide a computer program comprising instructions, which when executed by at least one processor, cause the at least one processor to construct a traffic filter.

These and other objects are met by embodiments of the proposed technology.

According to a first aspect, the proposed technology provides a method for constructing a traffic filter enabling routing of data between a wireless device and a Local Service Cloud, LSC, based service provider providing service(s) and/or application(s) for the wireless device. The method comprises:

obtaining information representing the identity of the wireless device requesting an application to be processed by the local cloud based service, and a representation of an application identity identifying the application;

selecting, based on the application identity, a Virtual Machine, VM, as the LSC based service provider suitable to process the application for the wireless device;

constructing a traffic filter based on the information representing the identity of the wireless device, the representation of the application identity and a representation of the identity of the selected VM, the traffic filter providing routing of data between the wireless device and the selected VM.

According to a second aspect the proposed technology provides a method for enabling routing of data packets between a wireless device in a cellular communication network and a Local Service Cloud, LSC, based service provider providing service(s) and/or application(s) for the wireless device. The method comprises the steps of:

installing a Local Break-Out, LBO, function in a network node serving the wireless device, the LBO function comprising a traffic filter constructed according to the first aspect enabling routing of data packets between the Local Service Cloud based service provider and the wireless device; and configuring the LBO function in the network node to select, also referred to as break out, data packets from the wireless device to be directed to the Local Service Cloud based service provider by means of the traffic filter and insert, also referred to as break in, data packets from the Local Service Cloud based service provider into a packet flow to be carried by the bearer and to be routed to the wireless device by means of the traffic filter.

According to third aspect the proposed technology a method for routing data packets between a wireless device in a cellular communication network and a Local Service Cloud, LSC, based service provider providing service(s) and/or application(s) for the wireless device. The method is performed by a network node serving the wireless device in the cellular communication network, and the method comprises the steps of:

selecting, also referred to as breaking out, data packets from the wireless device to be routed to the LSC based service provider; and inserting, also referred to as breaking in, data packets from the LSC based provider into a packet flow to be routed to the wireless device, wherein the data packets are routed by means of a traffic filter constructed according to the first aspect.

According to a fourth aspect, the proposed technology provides a system configured to construct a traffic filter enabling routing of data between a wireless device and a Local Service Cloud, LSC, based service provider providing service(s) and/or application(s) for the wireless device. The system is configured to obtain information representing the identity of the wireless device requesting an application to be processed by the local cloud based service, and a representation of an application identity identifying the application. The system is also configured to select, based on the application identity, a Virtual Machine, VM, as the LSC based service provider suitable to process the application for the wireless device. The system is furthermore configured to construct a traffic filter based on the information representing the identity of the wireless device, the representation of the application identity and a representation of the identity of the selected VM, the traffic filter providing routing of data between the wireless device and the selected VM.

According to a fifth aspect, the proposed technology provides a network node serving a wireless device in a cellular communication network and being configured to enable routing of data packets between the wireless device and a Local Service Cloud, LSC, based service provider providing service(s) and/or application(s) for the wireless device. The network node comprises an installed Local Break-Out, LBO, function, configured to select, also referred to as break out, data packets from the wireless device to be directed to the Local Service Cloud based service provider by means of the traffic filter and insert, also referred to as break in, data packets from the Local Service Cloud based service provider into a packet flow to be carried by the bearer and to be routed to the wireless device by means of the traffic filter. The LBO function comprises a traffic filter constructed by the system according to the fourth aspect, which enables a routing of data packets between the Local Service Cloud based service provider and the wireless device; and According to a sixth aspect, the proposed technology provides a network node, serving a wireless device in the cellular communication network, and configured for routing data packets between a wireless device in a cellular communication network and a Local Service Cloud, LSC, based service provider providing service(s) and/or application(s) for the wireless device. The network node is configured to select, also referred to as breaking out, data packets from the wireless device to be routed to the LSC based service provider. The network node is also configured to insert, also referred to as breaking in, data packets from the LSC based provider into a packet flow to be routed to the wireless device. The network node is further configured to rout data packets by means of a traffic filter constructed by the system according to the fourth aspect.

According to a seventh aspect the proposed technology provides a computer program comprising instructions, which when executed by at least one processor, cause the processor(s) to:

read information representing the identity of the wireless device requesting an application to be processed by the local cloud based service, and a representation of an application identity identifying the application;

select, based on the application identity, a Virtual Machine, VM, as the LSC based service provider suitable to process the application for the wireless device;

construct a traffic filter based on the information representing the identity of the wireless device, the representation of the application identity and a representation of the identity of the selected VM, the traffic filter providing routing of data between the wireless device and the selected VM.

According to an eight aspect the proposed technology provides a carrier comprising the computer program, wherein the carrier is one of an electronic signal, an optical signal, an electromagnetic signal, a magnetic signal, an electric signal, a radio signal, a microwave signal, or a computer-readable storage medium.

According to a ninth aspect the proposed technology provides a system for constructing a traffic filter enabling routing of data between a wireless device and a Local Service Cloud, LSC, based service provider providing service(s) and/or application(s) for the wireless device. The system comprises:

a communicating module for obtaining information representing the identity of the wireless device requesting an application to be processed by the local cloud based service, and a representation of an application identity identifying the application;

a selecting module for selecting, based on the application identity, a Virtual Machine, VM, as the LSC based service provider suitable to process the application for the wireless device;

a constructing module for constructing a traffic filter based on the information representing the identity of the wireless device, the representation of the application identity and a representation of the identity of the selected VM, the traffic filter providing routing of data between the wireless device and the selected VM.

Embodiments of the proposed technology enables a secure and efficient routing of data packets between a wireless device and a service provider based in the Local Service Cloud. Other advantages will be appreciated when reading the detailed description.

Of course, the present invention is not limited to the above features and advantages. Those of ordinary skill in the art will recognize additional features and advantages upon reading the following detailed description, and upon viewing the accompanying drawings.

BRIEF DESCRIPTION OF THE DRAWINGS

The embodiments, together with further objects and advantages thereof, may best be understood by making reference to the following description taken together with the accompanying drawings, in which:

FIG. 7A is a block diagram illustrating a particular embodiment of a system configured to construct a traffic filter according to the proposed technology FIG. 7B is a block diagram illustrating another particular embodiment of a system configured to construct a traffic filter according to the proposed technology FIG. 8A is a block diagram illustrating a particular embodiment of a network node according to the proposed technology.

FIG. 8B is a block diagram illustrating another particular embodiment of a network node according to the proposed technology.

DETAILED DESCRIPTION

Throughout the drawings, the same reference designations are used for similar or corresponding elements.

For a better understanding of the proposed technology, it may be useful to begin with a brief overview of the architecture a network and an associated Local Service Cloud. Reference is made to the particular example of FIG. 1 that illustrates some features of a network and a Local Service Cloud.

In this example, where for simplicity the general architecture is based on LTE technology, there is shown a wireless device 10, a network node 20, a Serving Gateway, SGW, 30, a PDN Gateway, PGW, 40 and a Local Service Cloud, LSC, 50.

Figure 1:
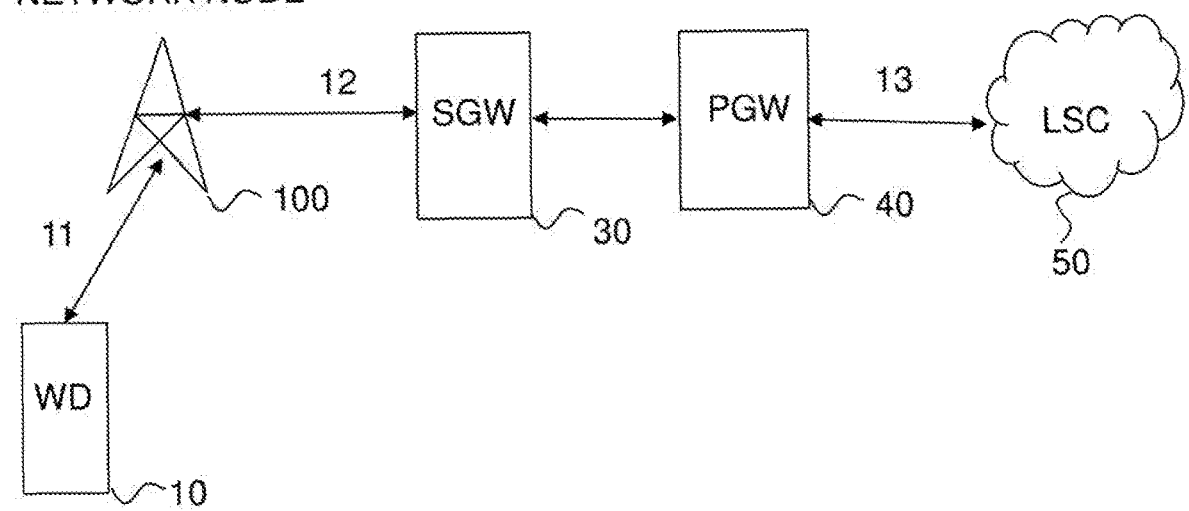
FIG. 1 is a schematic illustration of parts of a network and a Local Service Cloud

The SGW 30 provides functionalities in the form of routing and forwarding of user data packets. The PGW provides for connectivity between the wireless device, e.g. the UE and external networks, it acts as a network entry point and exit point for the wireless device. Also disclosed in FIG. 1 is a bearer 11 from the WD to the serving network node. This bearer might be a Radio Bearer, RB, over which data is carried from the network node to the wireless device. EPS bearer 12 is also disclosed, an EPS bearer provides for the possibility to transmit traffic between a WD and a PGW.

A Local Service Cloud, LSC, is essentially a pool of server hardware and/or virtual machines, VMs, hosting third party services and operator services, but that may also be used for transport- and network related features such as compression.

The Local Service Cloud 50 might contain a number of actual service providers that is generally denoted by the term Virtual Machines, VMs. These are the actual processing entities that performs the processing within the cloud. The VMs could for example be regular processors whose processing functionalities could be used by an external user, such as a wireless device.

Figure 2:
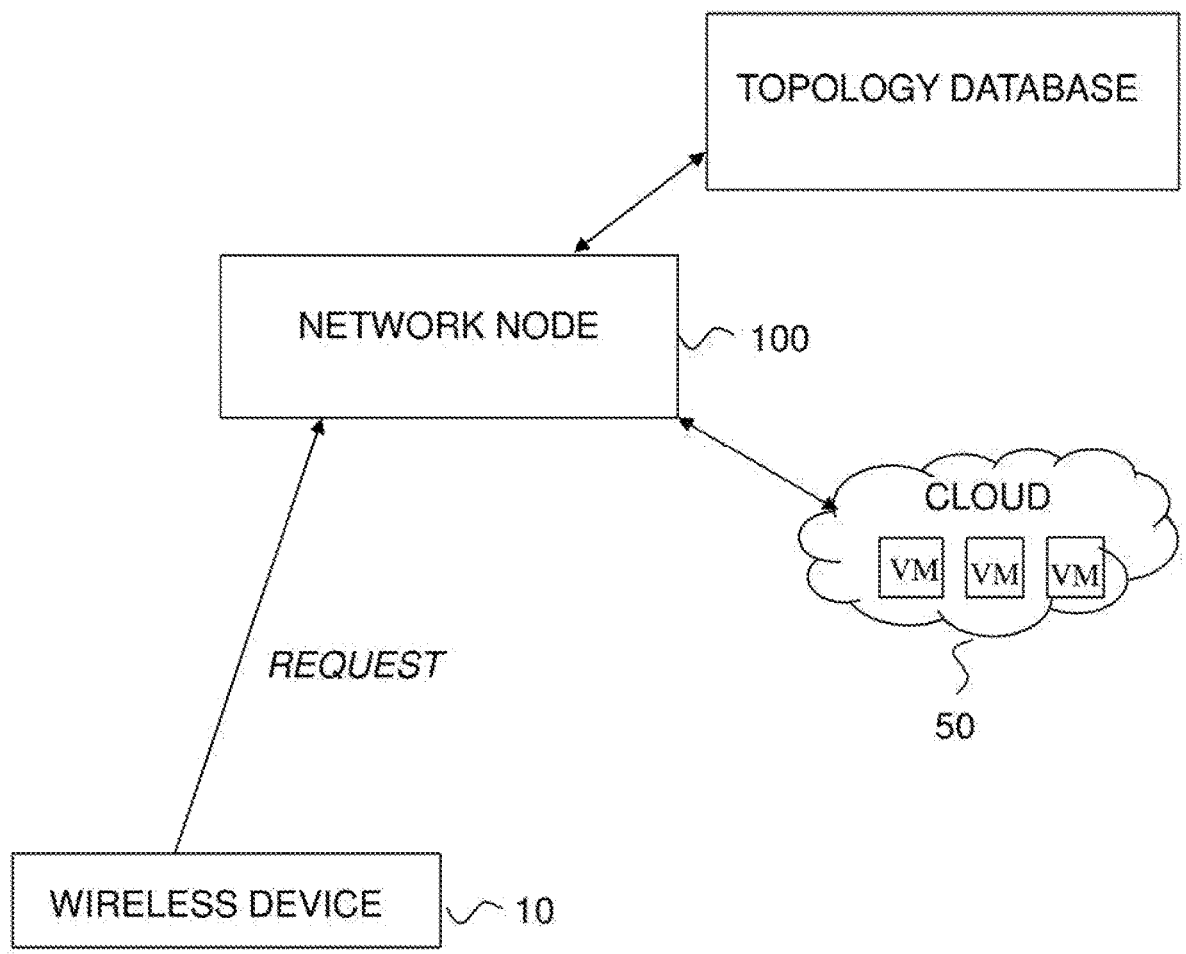
FIG. 2 is a schematic illustration of the signaling between entities according to a exemplary embodiment of the proposed technology

A possible scenario relevant for the proposed technology is schematically illustrated by means of the signaling diagram given in FIG. 2. A wireless device requests the service of having an application processed by a service provider hosted or situated in the Local Service Cloud.

According to the proposed technology this request initiates a mechanism whereby a traffic filter is constructed that enables routing or forwarding of data packets between the wireless device and a service provider based in the LSC. As used in this specification a traffic filter is a set of rules that directs or routes data packets between a wireless device and a service provider hosted by the LSC. Or put differently, a functionality that provides routing information or routing rules that determines how data packets should be routed. The present filter will be described more thoroughly in what follows.

According to an embodiment of the proposed technology it is provided a mechanism whereby a request from the wireless device to use cloud functionalities will initiate a traffic filter construction that will determine how data is to be routed between the wireless device and the service provider, i.e. a Virtual Machine, VM, based in the LSC.

Figure 3:
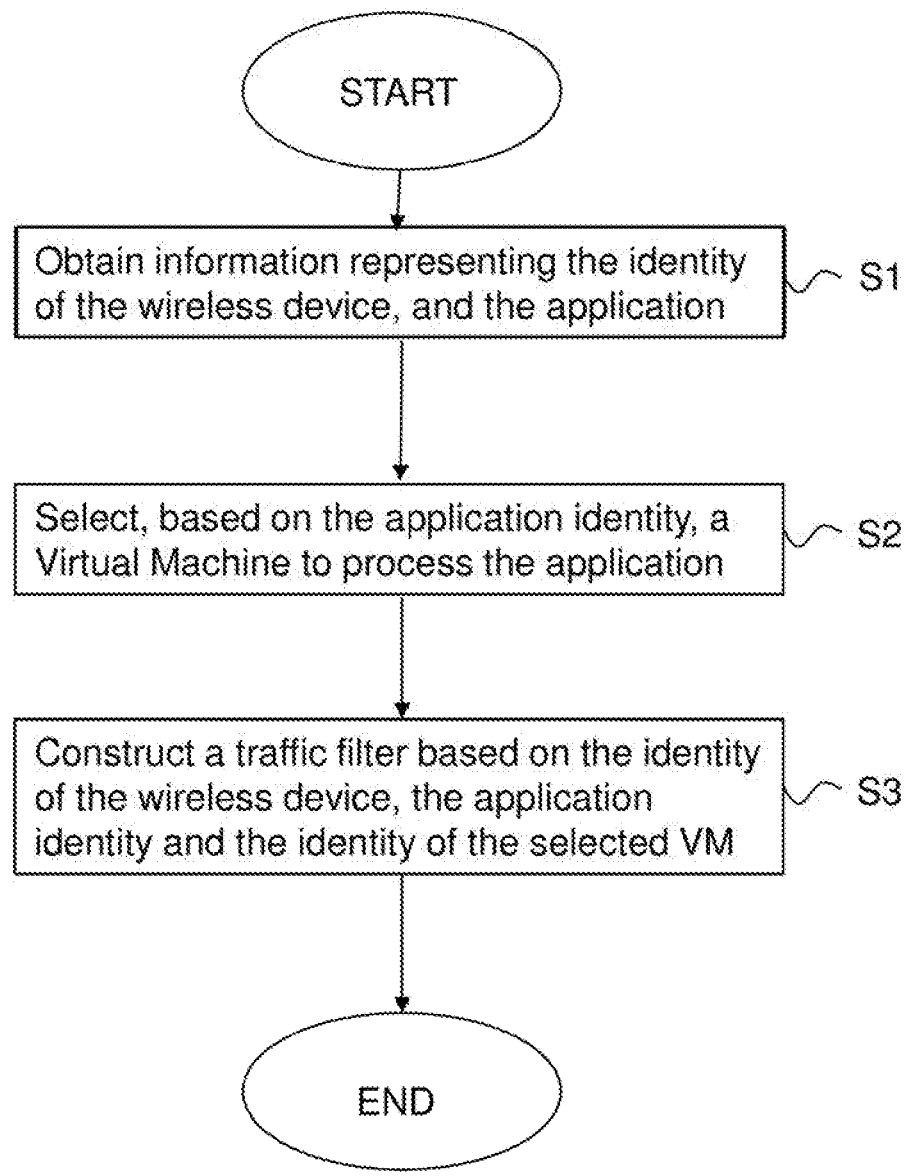
FIG. 3 is a flow diagram illustrating a particular embodiment of a method for constructing a traffic filter according to the proposed technology.

In FIG. 3 there is illustrated an embodiment of a method for constructing a traffic filter enabling routing of data between a wireless device and a Local Service Cloud, LSC, based service provider providing service(s) and/or application(s) for the wireless device. The method comprises:

- obtaining information representing the identity of the wireless device requesting an application to be processed by the local cloud based service, and a representation of an application identity identifying the application;
- selecting, based on the application identity, a Virtual Machine, VM, as the LSC based service provider suitable to process the application for the wireless device;
- constructing a traffic filter based on the information representing the identity of the wireless device, the representation of the application identity and a representation of the identity of the selected VM, the traffic filter providing routing of data between the wireless device and the selected VM.

The proposed method provides a way for allowing data packet routing on demand based on the particular application/service the wireless device has requested to be processed. Since the applications in general is chosen by the end-user, the chosen applications are not known in advance. The method therefor enables an end-user based access to the cloud functionalities on demand where a single request from an end-user in the form of a wireless device is used to both select, or assign, a Virtual Machine to process the application and provide data packet routing between the selected VM and the wireless device.

The proposed method moreover provides for an efficient way of constructing a traffic filter. The constructed traffic filter will enable a fast and secure routing of data packets between the wireless device and the selected VM. The proposed method allows, in a specific embodiment, for a construction of an alternative traffic filter that can handle Internet Protocol routing, or IP-routing, that is, it provides a traffic filter that can handle routing of data between two specified IP addresses. One identifying the wireless device and the other the selected VM. The constructed traffic filter is however able to provide various types of traffic filtering or routing, for example over various bearers such as Radio Bearers, ESPs bearers and Radio Access Bearers, RABs. Examples of such routing types will be described in more detail in what follows.

In a particular embodiment of the proposed method is the traffic filter constructed so that it comprises at least one uplink filter for routing of data from the wireless device to the selected VM and/or at least one downlink filter for routing of data from the selected VM to the wireless device.

In an example of an embodiment of the proposed method the identity of the wireless device may comprise at least one of the IMSI signature of the wireless device, the IP address of the wireless device or the MAC address of the wireless device.

In a possible embodiment of the proposed method is the VM is selected by determining conditional constraints optionally restricting the wireless device use of the application and using the determined conditional constraints to reduce the number of VMs suitable to process the application for the wireless device. If, for example, there are a large number of VMs within the LSC that is deemed suitable to process the application/service for the wireless device the number of VMs might be reduced if conditional constraints on the wireless device, the application and the VMs are taken into consideration. Since a suitable VM should be selected the use of conditional constraints to reduce the number of VMs could be advantageous.

It might be possible that, the conditional constraints of the VM, the application and the wireless device are so strict that the number of suitable VMs are reduced to zero.

The conditional constraints might, in a particular embodiment, comprise constraints relating to whether the wireless device is authorized to use the application. If the wireless device is not authorized to use the application, no VM will be selected and no a traffic filter will be constructed. Hence the identity of the application and the particular constraints on the application and the wireless device are used to determine whether a VM should be selected and whether a traffic filter should be constructed.

In still another embodiment of the proposed method the conditional constraints could comprises any of the following, or any combination of the following:

- constraints on the maximal limit for delays or packet losses making particular VMs non-selectable;
- security constraints rendering particular VMs non-selectable;
- geographical access constraints rendering particular VMs non-selectable;
- constraints on the network load rendering certain VMs non-selectable;
- constraints on the VM-load rendering certain VMs non-selectable;
- constraints on the latency limits making certain VMs non-selectable.

According to a particular example of the proposed method is the step S2 of selecting at least one VM based on information identifying a selection of Virtual Machines, VMs, within the local cloud that are deemed suitable to process the application for the wireless device.

The VMs contained in this selection of VMs might be VMs where the conditional constraints has been used to determine VMs fulfilling the conditional constraints.

According to a particular embodiment of the proposed method the information identifying a selection of VMs is obtained from a Topology Database, TDB, carrying information about existing VMs within the local cloud and information about the deployment of applications.

A Topology Database is a database provided with a topology. The topology is relational, that is, the topology defines relations between entities within the database, in this way a TDB is more than just arrays of data entities it also specifies the relations between the data entities. The concept of a topology database is well-known and no further description will be given here. In this particular application the used features of the TDB is the entities corresponding to the VMs and the VMs deployment of applications/services.

It might be preferable to use a topology database that comprises a topology map includes knowledge about unused resources for Storage and CPU of the VMs and also cloud based Traffic engineering algorithms that can be used for on-demand selection of suitable VMs to process the applications.

By way of example, the step S2 of selecting a VM might, in the proposed method, comprise extracting at least one VM from the selection of VMs by means of at least one Traffic Engineering, TE, algorithm.

By using a TE algorithm it will be possible to distinguish which of the VMs that are preferable to use based on comparison between the outcomes of the TE algorithm performed on individual VMs. Hence the TE algorithm is used to pick out, if not the optional VM, than at least a VM that is deemed satisfying according to the set criteria's.

In a particular embodiment of the proposed method at least one TE algorithm is chosen from the following, or any combination of the following:
  a shortest path algorithm, counting the number of hops among the VMs, wherein a suitable VM, comprised in the selection of VMs, and is selected if adhering to a constraint on the number of hops;
  a cost based optimization algorithm wherein a suitable VM, comprised in the selection of VMs, is selected based on a comparison with a cost threshold and the actual cost of the processing;
  a priority based optimization algorithm wherein a suitable VM, comprised in the selection of VMs, is selected based on priority values assigned to each VM within the local cloud.

By way of example, the step S3 of constructing a traffic filter enabling routing of data between the wireless device and the selected VM is, in a particular embodiment of the proposed method, based on information representing the IP address of the VM.

The method according to the above given embodiment specifies that the information that is used to identify the selected VM is the IP address of the VM. In the particular case where the corresponding information identifying the wireless device is the IP address of the wireless device the constructed traffic filter will provide for IP-routing of data packets between the selected VM and the wireless device.

In still another possible embodiment of the method is the step S3 of constructing a traffic filter enabling routing of data between the wireless device and the selected VM is based on information representing the identity of the Virtual Local Area Network, VLAN, hosting the selected VM.

By identifying the VLAN hosting the selected VM it will be possible to rout data packets effectively between the wireless device and the VM by routing in the most suitable way to the VLAN. For example on a designated bearer such as a particular EPS bearer providing a link between the wireless device and the VLAN. This routing of data packets to the VLAN might be all that is needed if the VLAN only contains a single VM, in this case the identity of the VM is uniquely determined and the data packet routing completely specified.

Since a VLAN however might contain more than a single VM the data routing needs to be further specified to find the particular selected VM. The traffic filter might therefore first rout the data packets to the entry point of the VLAN and upon arrival at the VLAN packets are routed to the particular VM by means of using the MAC address of the selected VM.

In other words, in still another exemplary embodiment of the proposed method is the step of constructing a traffic filter enabling routing of data between the wireless device and the selected VM, also based on a MAC address of the selected VM hosted by the VLAN.

In a possible embodiment of the proposed method is the step S3 of constructing a traffic filter enabling routing of data between the wireless device and the selected VM based on information representing the identity of at least one bearer used for routing data packets to the wireless device.

By utilizing information that identifies the bearer of the data packets in the construction of the traffic filter it is possible to route data between the wireless device and the selected VM in an efficient way where the suitable bearer of data packet is singled out. The traffic filter might therefor set, as a possible end-destination for the data packets address, the bearer of data packets that corresponds to either the VM, on the uplink from the wireless device to the VM, or the wireless device, on the downlink from the VM to the wireless device.

Figure 4:
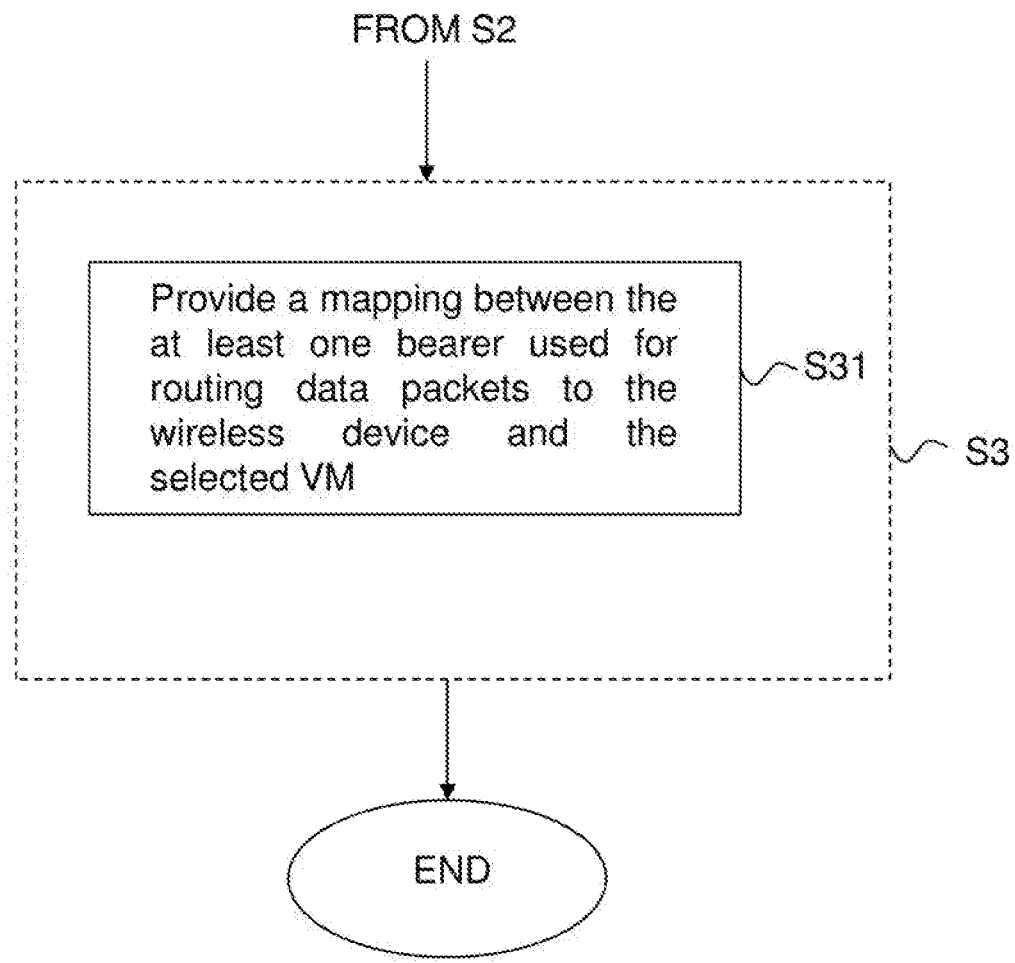
FIG. 4 is a flow diagram illustrating another particular embodiment of a method for constructing a traffic filter according to the proposed technology

In a specific example of the proposed method relating to the above, the step S3 of constructing a traffic filter also comprises the step S31 of providing a mapping between the at least one bearer used for routing data packets to the wireless device and the selected VM thereby enabling routing of data packets between the selected VM and the wireless device over the connection link defined by the bearer. This embodiment is schematically illustrated in FIG. 4.

In other words, the traffic filter is constructed so that a mapping is provided between the identified bearer and the VM. The traffic filter might then forward data packets from the wireless device to the VM on the uplink by identifying the bearer and using the provided mapping to single out the selected VM. The same could also be done on the downlink, that is, data packets from the VM could be forwarded to the wireless device over an identified bearer. If this particular bearer is not the single bearer of data packets to the wireless device, the method for constructing a traffic filter might comprise to provide a mapping between the identified bearer and the wireless device.

To construct a traffic filter that identifies the bearers is advantageous when the communication is viewed from the perspective of the user plane. This point of view will be described more below in relation to the use of a constructed traffic filter in the user plane.

In still another exemplary embodiment of the proposed method, the step S3 of constructing a traffic filter further comprises to determine the at least one bearer to be used for routing data packets from the VM to the wireless device.

In other words, the traffic filter determines the suitable bearer of data packets and forward the data packets on the determined bearer. In case the bearer does not uniquely identify the wireless device or the VM, the provided mappings between the bearer and the VM or wireless device can be used to forward the data packets to the end address.

In particular embodiments of the proposed method, the at least one bearer used to route data packets to the wireless device is at least one of: a Radio Bearer, RB, an EPS bearer or a Radio Access Bearer, RAB.

As a specific non-limiting example, suppose that a RB has been identified and the identity of the RB been used to construct the traffic filter. This particular RB would receive data packets forwarded from the selected VM with end destination the wireless device. If the concerned RB is the single RB serving the wireless device, that is, the RB provides the relevant radio link for the wireless device, than the inclusion of this identified RB into the traffic filter is enough to non-ambiguously forward data packets to the wireless device. On the other hand if the wireless device has several established RBs, a mapping between the wireless device and the RBs might be included so that the correct RB is singled out.

The same mechanism could also be used on the uplink. That is, if a bearer of data packets to the VM is identified, the inclusion of this bearer identity in the traffic filter could, in case there is a one to one correspondence between the VM and the bearer be enough to uniquely specify the VM. The traffic filter therefor enables data packets to be routed to the VM from the wireless device on the uplink by identifying the VM by means of identifying the bearer. Yet again a mapping between the VM and the bearers may be used in the case with several established bearers.

In other words, if a VM have several established bearers the traffic filter could comprise a mapping relating the bearers to the VM.

To provide a better understanding of the proposed technology a few non-limiting examples will be described. The examples are merely intended to facilitate the understanding of the concepts behind the proposed technology and should not in any way be construed as limitations of the proposed technology.

The intention of the following example is to provide a simplified example of how the proposed method for constructing a traffic filter is used in a particular scenario. The particular scenario relates to a situation with a single wireless device, having a single established Radio Bearer, RB, and where the selected VM is the single entity of a Virtual Local Area Network, VLAN.

A request to have an application processed by the LSC is obtained 51 from a wireless device. The request comprises two identities, or certain representations of the identities, a user-identity, providing an explicit or implicit identification the wireless device, and an application identity. The former identity could in the present case be implicitly represented by the RB since there is a single established RB for the wireless device. The latter identity provides an identification of the particular application the wireless device wants to be processed in the LSC. The application identity, Application-ID, might be a pointer that refers to a specific application type or to an explicit URL or to a text-string that can be matched to an application. Many examples of identifier could be used and the mentioned ones are merely specific examples.

In step S2 a Virtual Machine, VM, based in the LSC is selected. The VM is selected in order to provide the application processing service. The particular selection could for example be based on whether the user or the wireless device is authorized to use the application. This could be determined by means of checking whether the application ID is part of a list of authorized applications. If the user/wireless device is not authorized to use the application, the request is denied and a rejection response may optionally be returned to the actor.

If however it is determined that the user/wireless device is authorized to use the application, the selection procedure continues by collecting possible conditional constraints that is associated with the application. These conditional constraints are, together with the application ID, relayed or sent to a database such as a Topology Database, TDB. The purpose is to obtain, from the TDB, a selection of one or more suitable service providers, i.e., VMs within the LSC. The selection of suitable service providers is therefor, in this particular example, obtained from the TDB.

The functionality of the TDB is to use the relayed application ID and conditional constraints to select a list or a selection of suitable VMs based in the LSC. The topology database might extract the selection of VMs based on a single one of the following selection criteria, or any combination of the following selection criteria:

A selection of VMs in the LSC that are able to process the application. This can be determined based on the relayed application ID.

Traffic engineering (TE) algorithms that utilize the relayed conditional constraints in order to select the VMs. Different optimization algorithms can then be used to single out a suitable selection, the following TE-algorithms could be used alone or in any possible combination:

Shortest path to the VM counted in the number of hops among the VMs that fulfill the constraints.

Cost based decision. Instead of using strict binary decision of the constraints that might be for example thresholds, it is possible to calculate the difference between the actual value and the thresholds and apply a cost function to the difference values. The resulting cost can then be compared to a threshold to make the binary decisions.

Priority based decision. In this particular case a priority is assigned to a VM based on the conditional constraints. For example by providing a particular priority to the VMs based on whether or not they are fulfilling a particular number of constraints. The priorities assigned to the VMs might then be used to extract VMs suitable for processing the application.

In the end a particular VM is selected for processing the requested application.

Based on the selected VM a traffic filter is constructed S3 that enables routing of data packets between the user/wireless device and the selected VM. In this particular example at hand the constructed traffic filter comprises a representation of the identity of the wireless device. In the case at hand this identity could either be explicit, by providing for example the IMSI OR the IP address of the wireless device, or implicit by providing an identity of the single established RB. The identity of the RB will in this case uniquely determine the wireless device. As has been explained earlier, if the wireless device had several established RB s, the traffic filter may comprise a mapping between RBs and the wireless device. The IP address of the wireless device or the identity of the RB forms part of downlink section of the traffic filter. On the uplink section an identity singling out the VLAN could be used. Since there is only a single VM hosted in the VLAN, the identity of the VLAN will uniquely specify the VM, conversely the identity of the VM, for example its IP address will uniquely specify the VLAN in which the VM is hosted. If there was instead a number of VMs hosted by the VLAN than further information specifying the VM could be used. For example the IP address or the MAC address of the VM.

A traffic filter is thereby constructed that enables data packets to be routed between the selected VM and the wireless device. Since the traffic filter comprises both a UL section and a DL section it enables routing of data packets to the VM, from the wireless device, as well as to the wireless device from the VM.

Having described in detail the method for constructing a traffic filter enabling routing of data between a wireless device and a Local Service Cloud, LSC, based service provider. The following will be related to how such a traffic filter can be used in the user plane, or equivalently on the data plane or bearer plane. In particular it relates to how a network node is able to utilize such a traffic filter to enable routing of data between a wireless device and a Local Service Cloud, LSC, based service provider.

A particular issue at hand is that only selected parts of the traffic from a wireless device should be routed or, equivalently, directed to the LSC. In order to break out the relevant data packets to be routed to the LSC and to avoid breaking out data packets not intended to be broken out it is proposed a deployment of a Local Break-Out function, LBO function, that is dynamically configured to break out and/or break in the relevant data packets and route or direct the data packets between the LSC to the correct wireless device and/or bearer. The routing of data packets may be performed with a traffic filter according to what has been described earlier. The proposed technology addresses the deployment of such a LBO function.

Before providing concrete embodiments of the proposed technology an overview will be given that provide a conceptually geared description of the proposed technology that also highlights how the earlier described traffic filter is used.

The proposed operation of the network node is based on having LBO functions installed. The functionality of these LBO functions is to govern which traffic that should be broken out of a traffic flow and also inserted into a traffic flow. The LBO function for an application flow comprises a traffic filter as described earlier providing a mapping between the VM and the established bearer, for example an EPS bearer and the VLAN associated to the VM selected to process the application. In the uplink UL the LBO function selects the data packets to be broken out and the traffic filter that provides a mapping between, e.g. the EPS bearer and the VLAN, governs which VLAN, and implicitly by means of, for example the MAC address of the VM, which VM the LBO function will forward the broken out packet to. In the downlink, DL, the LBO function may use a traffic filter that determine the particular radio bearer on which to forward a packet from the LSC, for example by means of a VM-bearer mapping, e.g., a VLAN-EPS bearer mapping.

Such an LBO function is suitable to handle a single traffic flow, that is, for a flow related to a single interaction between a wireless device and a VM that processes a single application in the LSC. If a wireless device has multiple simultaneous traffic flows that are broken out to the LSC, that is, in the case that the wireless device is interacting with multiple applications processed in the LSC, there could be an LBO function for each traffic flow. Moreover, if a wireless device has multiple simultaneous traffic flows, all of which are using the same IP address identifying the wireless device, which are broken out to applications running on the same VM in the LSC, and if the wireless device uses different radio bearers for the concerned traffic flows, then each LBO function also has to identify the data packets in the DL, so that different DL traffic flows are correctly forwarded on their respective radio bearer.

Figure 5:
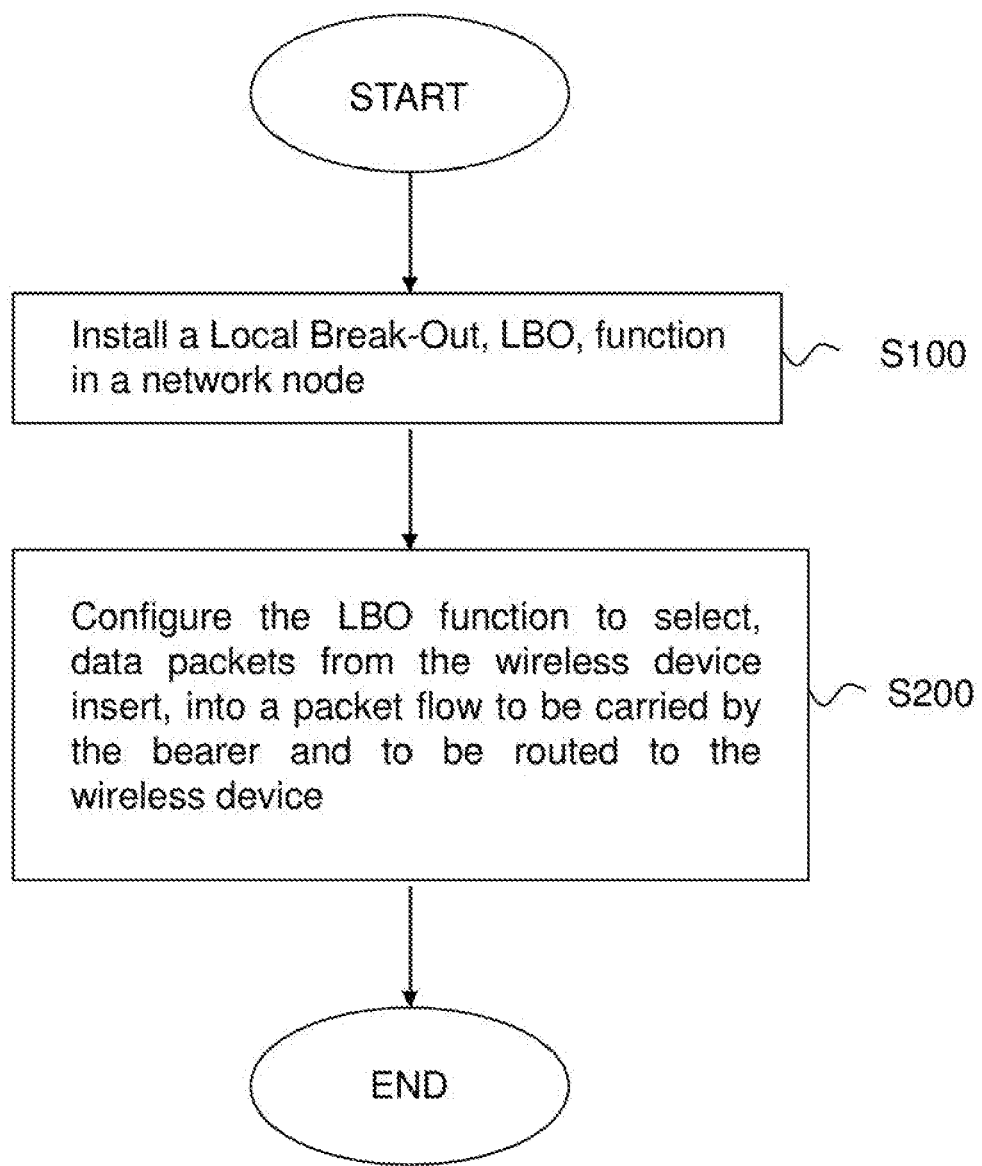
FIG. 5 is a flow diagram illustrating an embodiment of a method for enabling routing of data packets between a wireless device and a service provider based in the Local Service Cloud, LSC.

With this conceptual description at hand reference is now made to FIG. 5 where it is schematically shown a flow diagram illustrating an embodiment of a method for enabling routing of data packets between a wireless device in a cellular communication network and a Local Service Cloud, LSC, based service provider providing service(s) and/or application(s) for the wireless device. The method comprises the steps of:

installing S100 a Local Break-Out, LBO, function in a network node serving the wireless device, the LBO function comprising a traffic filter, constructed according to what has been described above, enabling routing of data packets between the Local Service Cloud based service provider and the wireless device; and configuring S200 the LBO function in the network node to select, also referred to as break out, data packets from the wireless device to be directed to the Local Service Cloud based service provider by means of the traffic filter, constructed according to what has been described above, and insert, also referred to as break in, data packets from the Local Service Cloud based service provider into a packet flow to be carried by the bearer and to be routed to the wireless device by means of the traffic filter.

The proposed technology provides a way of creating and deploying Local Break-Out functionality that enables a network node to both break out the relevant data packets to the LSC and to insert/break in the relevant data packets from the LSC. The corresponding data packets can then be directed to their final destination by means of a traffic filter according to what has been described earlier. This functionality can handle multiple traffic flows as well as multiple bearers associated with the same wireless device.

In an optional embodiment of the proposed method, the step of configuring S200 the LBO function is triggered based on a Domain Name Server, DNS, query for an application or service hosted by the LSC.

This optional embodiment provides for a fully dynamical approach based on a local DNS proxy in LSC. When a wireless device initially attaches to a network, i.e., by means of an attach procedure, the core network configures the wireless device with, among other parameters, the IP address of the particular DNS server that the wireless device is expected to transmit its DNS queries to. This in accordance with regular standards and procedures.

In a particular exemplary embodiment, the LBO function in each network node might be configured with a static LBO function in order to breakout DNS queries from wireless devices and direct these to the DNS proxy in the LSC. This static LBO function might contain a traffic filter matching the DNS queries and an identifier of the VLAN that leads to the VM on which the DNS proxy is running. The traffic filter may comprise the DNS server IP address that the core network has configured the wireless device with, this could be assumed to be the same for all wireless devices, or the default port number for DNS queries or both of these in combination. A specific embodiment might only include the DNS query default port, which also allows arbitrary DNS server IP addresses. Such a described static LBO function could be complemented with a more dynamic part that handles the part where a DNS query is intercepted and redirected to the LSC. The dynamic part might comprise of the IP address of the wireless device and a downlink, DL, mapping from, e.g. the VLAN to the EPS bearer on which the DNS query was sent.

If the DNS proxy is unable to respond to the query, for example due to the fact that the query does not concern an application that is supported in the LSC, it may forward the query to the originally addressed DNS server. The DNS proxy is transparent in the sense that its presence is not noticeable for the wireless device. The DNS proxy does not have its own IP address. It accepts any destination IP address in the query, a fact that enables it to process DNS queries originally addressed to any DNS server IP address. When the DSN proxy responds to a query, with the IP address of a selected VM processing the application in the LSC, it uses the destination IP address of the query as the source IP address in the response. When the DNS proxy forwards a query, it keeps the IP address of the wireless device as the source address and the IP address of the originally addressed DSN server as the destination address. That is, it forwards the original DNS query, including the IP packet that carries it, unmodified.

In still another particular embodiment is the LBO function adapted to intercept the DNS query and direct the query to a local DNS proxy in the LSC and adapted to receive, from the local DNS proxy, LBO function information for an expected traffic flow of the application or service, and wherein the LBO function is configured for the expected packet flow based on the LBO function information.

In the case that the DNS proxy finds that the application a DNS query pertains to is supported in the LSC, a LBO function for the expected traffic flows of the concerned application could be established. The DNS proxy could for example contribute to the traffic filter of the LBO function by providing as input, for example, the application server IP, i.e., the IP address of the selected VM processing the application, the IP address of the wireless device and an application identity. Functionality associated with the LBO function and/or the LSC, e.g. LSC orchestration functionality, may interact with the DNS proxy to select the VM to be used, e.g. in case the same application is processed by multiple VMs based in the LSC. When the VM has been selected, a bearer-VM mapping, e.g., a VLAN-EPS bearer mapping can be set. For example relating the VLAN associated with the selected VM with the EPS bearer that the DNS query was sent on. In case the wireless device has multiple EPS bearers it is possible to initially establish the LBO function, including a VM-bearer mapping, e.g., a VLAN-EPS bearer mapping, for each of the wireless device EPS bearers. When the first application data packet flow arrives at the LBO function, i.e. when the first packet matches the traffic filter of one of the LBO functions, this is seen as an indication of which bearer, e.g. EPS bearer, that is used and consequently the LBO function(s) associated with the other EPS bearer(s) can be deleted. For the last part of the LBO function the DNS proxy or the functionality associated with the LBO function and/or the LSC, such as the LSC orchestration functionality, or this functionality in cooperation with the DNS proxy, provides the transport protocol and application port number to the traffic filter(s) of the LBO function if this is needed in order to separate multiple traffic flows from the same wireless device.

To further facilitate the understanding of the proposed method a concrete example will be given in the context of an Evolved Packet System, EPS/Long Term Evolution, LTE, cellular network. Even though this example is described using terms and concepts of an EPS/LTE cellular network, it should be pointed out that the principles of the proposed technology could equally well be applied to cases where the cellular networks are based on other standards, such as a Universal Mobile Telecommunications System, UMTS, Wideband Code Division Multiple Access, WCDMA, and High Speed Packet Access, HSPA.

In the case of an LTE network the LBO function might also, on the downlink, utilize a mapping that relates the contents of a downlink packet to the User Equipment context, UE context in the eNodeB. The UE context comprises data primarily related to the bearers of the UE/wireless device including data providing the identities of established bearers for the UE/wireless device. In addition the UE context comprises, for example, identifiers for the signaling connection between the eNodeB and the Mobility Management Entity, MME, used for signaling related to the UE. This signaling connection is also referred to as a S1 connection. The UE context could moreover also comprise user subscription related information.

The following identifiers of the bearers may be derived from the content of the UE context and used to identify the EPS bearers in the VLAN-EPS bearer mapping describe earlier:
Radio bearer ID, providing a unique ID for one UE within one eNodeB
EPS bearer ID providing a unique ID for one UE
Extended EPS bearer ID, an ID that will be defined below
If the wireless device, or equivalently the User Equipment, UE, has a single established radio bearer, that is, a single data radio bearer, than the VLAN-EPS bearer mapping described earlier is redundant in the downlink, DL. That is because of the fact that the destination IP address of the packet, that is, the IP address of the UE and the mapping to the UE context, i.e. a reference to the UE context, is enough to single out the radio bearer to use since it is the only radio bearer included in the UE context.

Since the bearer is associated with the UE context, the UE context might be identified based on the bearer of a broken-out uplink, UL, packet that is subject to local breakout. This could, for example, be the first UL packet that matches the traffic filter in the LBO function for the concerned application flow or, as an alternative, the UL packet containing the DNS query that triggered the LBO function creation.

An identifier that might be used to identify the EPS bearer in the VLAN-EPS bearer mapping could be a particular type of ID that in the present disclosure is referred to as an Extended EPS bearer ID. An Extended EPS bearer ID consists of a combination of three identifiers: 1) the MME UE S1AP ID, 2) the EPS bearer ID, 3) either the Globally Unique Mobility Management Entity Identifier, GUMMEI or the IP address of a Mobility Management Entity MME. The combination provides an identifier that is globally unique.

The MME UE S1AP ID given above is a well-defined ID within the technical field that can be used to provide an identification of a UE, or more precisely, an identification of the MME side of a signalling connection between an eNodeB and a MME for signalling pertaining to a certain UE, the signalling connection is also referred to as a S1 connection.

The GUMMEI is a globally unique ID and so is the MME IP address unless the operator uses private IP addresses for its MMEs. In the latter case it might be preferred to use the GUMMEI.

Since the Extended EPS bearer ID includes a reference to the UE context, by means of the MME UE S1AP ID combined with either the GUMMEI or the MME IP address, this reference may serve to map the DL packets that, for example, has been identified by the IP address of the UE to the UE context. In this case no additional UE context mapping references is needed in the LBO function and they can therefor optionally be omitted.

The above described LBO function is enough to handle a single traffic flow, i.e. essentially a single UE's interaction with a single application in the LSC. If a UE has multiple simultaneous traffic flows that are broken out to the LSC, e.g. interacting with multiple LSC applications, there might be an LBO function for each traffic flow. Moreover, if a UE has multiple simultaneous traffic flows, all using the same UE IP address, that are broken out to applications running on the same VM in the LSC, for example interacting with multiple LSC applications hosted on the same VM or using different traffic flows towards the same application and the UE uses different radio bearers for the concerned traffic flows, then each LBO function might also include a traffic filter to identify the packets in the DL, so that the different DL traffic flows are correctly forwarded on their respective radio bearer. As long as only a single VM per VLAN is possible, the DL packet filter need only to contain the transport protocol and the source and destination port numbers to distinguish the different DL application flows to the same UE, but if multiple VMs can be hosted by the same VLAN, then the source IP address, i.e. the VM IP address, could also be included in the DL packet filter. Another optional feature is that the DL traffic filter could be omitted for one of the LBO functions, which would mean that DL packets from the LSC which do not match the traffic filter of any of the other LBO functions for the same UE would be governed by the LBO function without traffic filter.

Hence, in the general case a LBO function consists of an UL packet filter, a DL packet filter, a VLAN-EPS bearer mapping and might also contain a reference to the UE context. The latter may be integrated with the Extended EPS bearer ID if that particular ID is used in the VLAN-EPS bearer mapping. The UE IP address might also be used to forward DL packets to the correct UE.

Figure 11:
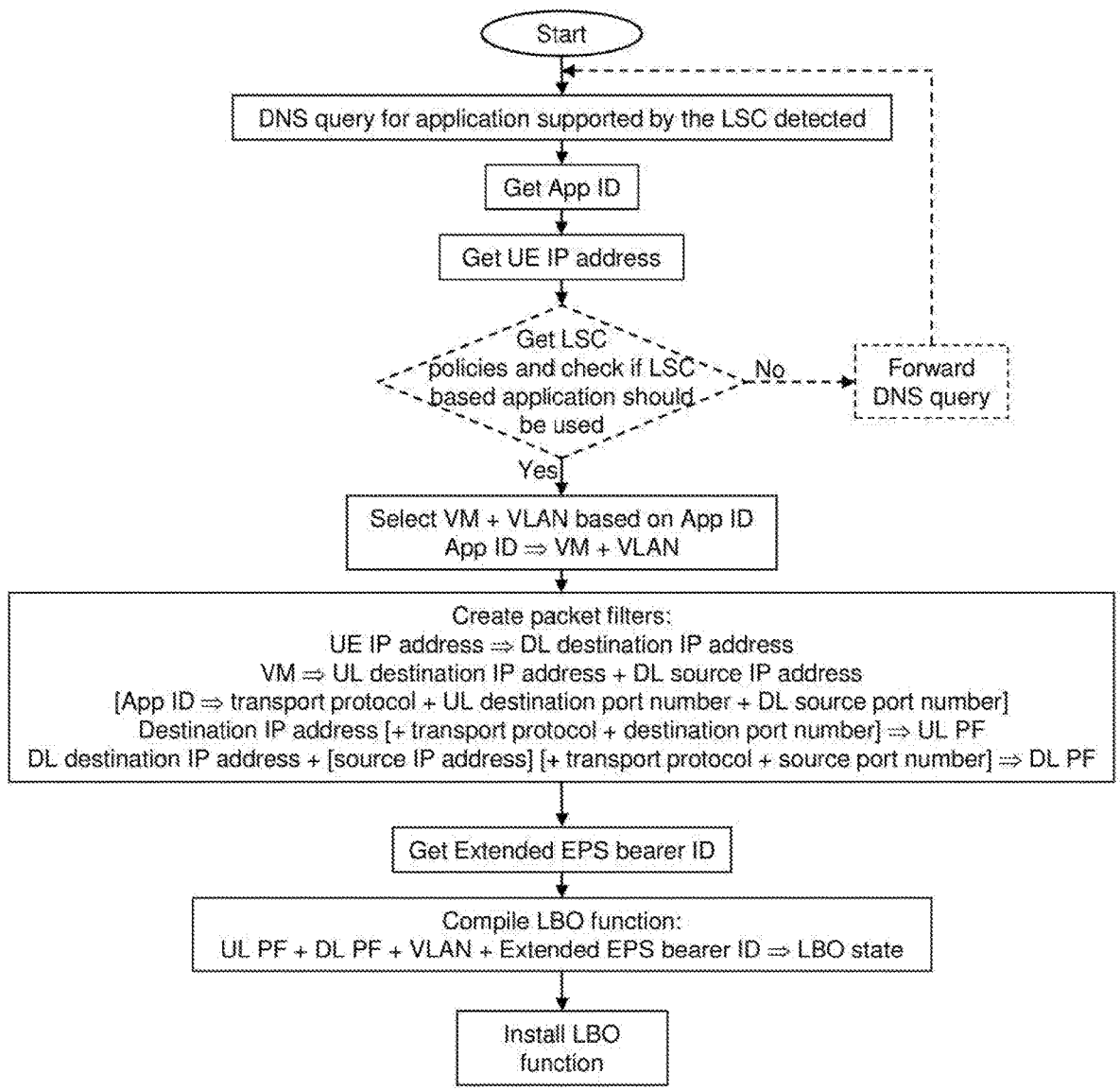
FIG. 11 is a flow diagram illustrating an exemplary embodiment of the proposed technology.

A particular example of how a LBO function can be established is provided in the flow diagram of FIG. 11. In FIG. 11 the following is illustrated:

A DNS query is detected for an application that can be processed within the Local Service Cloud.

The application ID is obtained from the detected DNS query.

The IP address of the wireless device is obtained, for example from the source address of the IP packet that carries the DNS query.

An optional step of obtaining LSC constraints might be performed, it is also possible to check whether it is suitable to process the application in the LSC, if deemed not suitable the process can be terminated.

A VM belonging to a VLAN is selected based on the ID of the application and optionally on the LSC constraints, if such constraints were obtained. That is, the application ID and possibly the LSC constraints are used to select a VM and a VLAN associated to the VM.

A traffic filter is constructed. The selected VM constitutes the uplink, UL, destination or the downlink, DL, source. The uplink, UL, traffic filter comprises the IP address of the destination and, optionally, a transport protocol and the port number of the destination. The downlink, DL, traffic filter comprises the IP address of the destination, that is the IP address of the wireless device, and might optionally comprise the IP address of the source and optionally also the transport protocol and/or the port number of the source.

A bearer ID is obtained, the bearer ID is in this particular example an Extended EPS bearer ID as described earlier. In the case where the bearer ID is different from an Extended EPS bearer ID this particular step might also comprise to obtain a separate UE context reference in order to identify the particular bearer. This feature is however not necessary in the case an Extended EPS bearer ID is used since the Extended EPS bearer ID already includes a UE context reference.

The LBO function is compiled. The LBO function comprises UL and DL traffic filters, information about VLAN and the bearer ID, e.g., the Extended EPS bearer ID. As mentioned above, in the particular example of FIG. 11, the IP address of the wireless device is a part of the DL traffic filter, another option might however to keep it as a separate item in the LBO function.

Having compiled the LBO function, the LBO function is ready to be installed in a network node.

Figure 6:
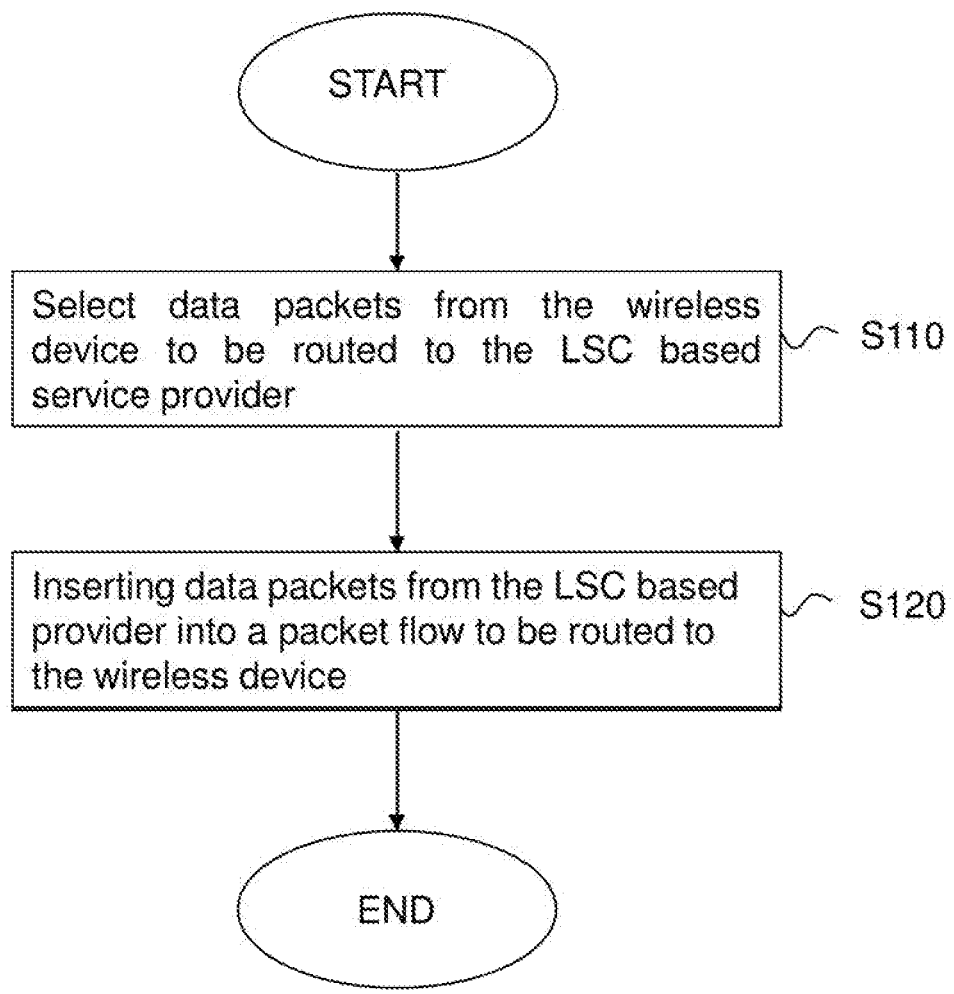
FIG. 6 is a flow diagram illustrating an embodiment of a method for routing data packets between a wireless device and a service provider based in the Local Service Cloud, LSC.

Reference is now made to FIG. 6 where there is disclosed a method for routing data packets between a wireless device in a cellular communication network and a Local Service Cloud, LSC, based service provider providing service(s) and/or application(s) for the wireless device, wherein the method is performed by a network node serving the wireless device in the cellular communication network. The method comprises the steps of:

selecting S110, also referred to as breaking out, data packets from the wireless device to be routed to the LSC based service provider; and inserting S120, also referred to as breaking in, data packets from the LSC based provider into a packet flow to be routed to the wireless device, wherein the data packets are routed by means of a traffic filter constructed according to what has been described above.

In a possible embodiment of the proposed method, the network node breaks out packets from the wireless device to be directed to the LSC based service provider and breaks in packets from the LSC based service provider to be directed to the wireless device between a radio interface part and a non-radio interface part of a bearer associated with the wireless device.

In another possible embodiment of the proposed method the LSC based service provider is based on at least one Virtual Machine, VM, each VM being associated with an individual Virtual Local Area Network, VLAN, and the network node controls on which VLAN the selected packets are to be forwarded to the corresponding VM on which the application or service is running, based on a bearer-VLAN mapping providing a mapping between a bearer for the wireless device and the VLAN to the VM on which the application or service is running.

In a particular embodiment of the proposed method the network node also controls on which radio bearer packets are to be forwarded from the LSC based service provider to the wireless device.

By way of example, in the proposed method the network node intercepts a Domain Name Server, DNS, query for an application or service hosted by the LSC based service provider and directs the query to a local DNS proxy in the LSC based service provider and receives, from the local DNS proxy, information for enabling the node to control the breaking out and/or breaking in of packets belonging to an expected traffic flow related to the application.

The proposed technology also provide a system for constructing a traffic filter as described in the description. FIG. 7A illustrates schematically an exemplary embodiment of such a system. FIG. 7A shows a system 100 comprising a processor 122 and a memory 124 that is configured to construct a traffic filter enabling routing of data between a wireless device and a Local Service Cloud, LSC, based service provider providing service(s) and/or application(s) for the wireless device. The system is configured to obtain information representing the identity of the wireless device requesting an application to be processed by the local cloud based service, and a representation of an application identity identifying the application. The system is also configured to select, based on the application identity, a Virtual Machine, VM, as the LSC based service provider suitable to process the application for the wireless device. The system is furthermore configured to construct a traffic filter based on the information representing the identity of the wireless device, the representation of the application identity and a representation of the identity of the selected VM, the traffic filter providing routing of data between the wireless device and the selected VM.

In a particular embodiment of the system is the system is configured to construct a traffic filter comprising at least one uplink filter for routing of data from the wireless device to the selected VM and/or at least one downlink filter for routing of data from the selected VM to the wireless device.

In yet another embodiment of the system is the system configured to obtain the identity of the wireless device by obtaining at least one of the IMSI signature of the wireless device, the IP address of the wireless device or the MAC address of the wireless device.

In still another embodiment of the system is the system configured to select the VM by determining conditional constraints optionally restricting the wireless device use of the application and using the determined conditional constraints to reduce the number of VMs suitable to process the application for the wireless device.

By way of example, a possible embodiment of the system provides a system that is configured to select the VM based on conditional constraints that comprises constraints relating to whether the wireless device is authorized to use the application.

A particular embodiment of the system provides a system that is configured to select the VM based on conditional constraints that comprises any of the following, or any combination of the following:
  constraints on the maximal limit for delays or packet losses;
  security constraints rendering particular VMs non-selectable;
  geographical access constraints rendering particular VMs non-selectable;
  constraints on the network load rendering certain VMs non-selectable;
  constraints on the VM-load rendering certain VMs non-selectable;
  constraints on the latency limits making certain VMs non-selectable.

A possible example of an embodiment of the system provides a system that is configured to select at least one VM based on information identifying a selection of Virtual Machines, VMs, within the local cloud that are deemed suitable to process the application for the wireless device.

An optional embodiment of a system provides a system that is configured to obtain the information identifying a selection of VMs from a Topology Data Base, TDB, carrying information about existing VMs within the local cloud and information about the deployment of applications.

A possible embodiment of a system according to the proposed technology provides a system that is configured to select a VM by extracting at least one VM from the selection of VMs by means of at least one Traffic Engineering, TE, algorithm.

An optional embodiment of a system provides a system that is configured to extract at least on VM based on at least one TE algorithm comprising any of the following, or any combination of the following:
  a shortest path algorithm, counting the number of hops among the VMs, wherein a suitable VM, comprised in the selection of VMs, and is selected if adhering to a constraint on the number of hops;
  a cost based optimization algorithm wherein a suitable VM, comprised in the selection of VMs, is selected based on a comparison with a cost threshold and the actual cost of the processing;
  a priority based optimization algorithm wherein a suitable VM, comprised in the selection of VMs, is selected based on priority values assigned to each VM within the local cloud.

In an optional embodiment is the system configured to construct a traffic filter enabling routing of data between the wireless device and the selected VM based on information representing the IP address of the VM.

In a particular embodiment of a system is the system configured to construct a traffic filter enabling routing of data between the wireless device and the selected VM based on information representing the identity of the Virtual Local Area Network, VLAN, hosting the selected VM.

An optional variant of a system provides a system that is configured to construct a traffic filter enabling routing of data between the wireless device and the selected VM, also based on a MAC address of the selected VM hosted by the VLAN.

By way of example, a possible embodiment provides a system that is configured to construct a traffic filter enabling routing of data between the wireless device and the selected VM based on information representing the identity of at least one bearer used for routing data packets to the wireless device.

Still another embodiment of a system provides for a system that is configured to construct a traffic filter by also providing a mapping between the at least one bearer used for routing data packets to the wireless device and the selected VM thereby enabling routing of data packets between the selected VM and the wireless device over the connection link defined by the bearer.

In an optional embodiment is the system configured to construct a traffic filter by determining the at least one bearer to be used for routing data packets from the VM to the wireless device.

A specific example of an embodiment provides a system that is configured to construct a traffic filter by determining at least one bearer used to route data packets to the wireless device, the bearer being at least one of: a Radio Bearer, RB, an EPS bearer or a Radio Access Bearer.

In a particular embodiment of the system, illustrated in FIG. 7A, it is provided a system that comprises a processor 122 and a memory 124, the memory 124 comprising instructions executable by the processor 122, whereby the processor 122 is operative to construct the traffic filter.

Still another particular embodiment of the system is illustrated in FIG. 7B and provides a system that comprises communication circuitry 110 configured to obtain information representing the identity of the wireless device requesting an application to be processed by the local cloud based service, and a representation of an application identity identifying the application.

The proposed technology also provides a network node 150, serving a wireless device in a cellular communication network. The network node is configured to enable routing of data packets between the wireless device and a Local Service Cloud, LSC, based service provider providing service(s) and/or application(s) for the wireless device. The network node comprises an installed Local Break-Out, LBO, function, configured to select, also referred to as break out, data packets from the wireless device to be directed to the Local Service Cloud based service provider by means of a traffic filter and insert, also referred to as break in, data packets from the Local Service Cloud based service provider into a packet flow to be carried by the bearer and to be routed to the wireless device by means of a traffic filter. The LBO function comprises a traffic filter that is constructed by the above described system, and which enables routing of data packets between the Local Service Cloud based service provider and the wireless device. An embodiment of such a network node is schematically illustrated in the block diagram of FIG. 8A.

In a particular embodiment of the network node is the LBO function configured to trigger based on a Domain Name Server, DNS, query for an application or service hosted by the LSC.

In a possible embodiment of the network node is the LBO function configured to intercept the DNS query and direct the query to a local DNS proxy in the LSC and configured to receive, from the local DNS proxy, LBO function information for an expected traffic flow of the application or service, and wherein the LBO function is configured for the expected packet flow based on the LBO function information.

The proposed technology also provides a network node 150, serving a wireless device in the cellular communication network, and configured for routing data packets between a wireless device in a cellular communication network and a Local Service Cloud, LSC, based service provider providing service(s) and/or application(s) for the wireless device. The network node is configured to select, also referred to as breaking out, data packets from the wireless device to be routed to the LSC based service provider. The network node is also configured to insert, also referred to as breaking in, data packets from the LSC based provider into a packet flow to be routed to the wireless device by means of a traffic filter constructed by the described system.

A particular example of a network node according to the proposed technology provides a network node that is configured to break out packets from the wireless device to be directed to the LSC based service provider and break in packets from the LSC based service provider to be directed to the wireless device between a radio interface part and a non-radio interface part of a bearer associated with the wireless device.

In a possible embodiment of the proposed network node is the LSC based service provider based on at least one Virtual Machine, VM, each VM being associated with an individual Virtual Local Area Network, VLAN. The network node controls on which VLAN the selected packets are to be forwarded to the corresponding VM on which the application or service is running, based on a bearer-VLAN mapping providing a mapping between a bearer for the wireless device and the VLAN to the VM on which the application or service is running.

In an optional embodiment of the network node, the network node also controls on which radio bearer packets are to be forwarded from the LSC based service provider to the wireless device.

By way of example, a possible embodiment of the proposed network node provides a network node that is configured to intercept a Domain Name Server, DNS, query for an application or service hosted by the LSC based service provider and wherein the network node is configured direct the query to a local DNS proxy in the LSC based service provider and wherein the network node is configured to receive, from the local DNS proxy, information for enabling the network node to control the breaking out and/or breaking in of packets belonging to an expected traffic flow related to the application.

A particular embodiment of the proposed network node provides a network node that comprises a processor 220 and a memory 230, the memory 230 comprising instructions executable by the processor 220, whereby the processor 220 is operative to rout data packets between a wireless device in a cellular communication network and a Local Service Cloud, LSC, based service provider providing service(s) and/or application(s) for the wireless device. A schematic illustration of an embodiment of such network node is given in FIG. 8A.

In still another particular embodiment illustrated in FIG. 8B, the network node also comprises communication circuitry 210 configured to obtain information enabling the network node to rout data packets between a wireless device in a cellular communication network and a Local Service Cloud, LSC, based service provider providing service(s) and/or application(s) for the wireless device.

As used herein, the non-limiting terms "User Equipment" and "wireless device" may refer to a mobile phone, a cellular phone, a Personal Digital Assistant, PDA, equipped with radio communication capabilities, a smart phone, a laptop or Personal Computer, PC, equipped with an internal or external mobile broadband modem, a tablet PC with radio communication capabilities, a target device, a device to device UE, a machine type UE or UE capable of machine to machine communication, iPAD, customer premises equipment, CPE, laptop embedded equipment, LEE, laptop mounted equipment, LME, USB dongle, a portable electronic radio communication device, a sensor device equipped with radio communication capabilities or the like. In particular, the term "UE" and the term "wireless device" should be interpreted as non-limiting terms comprising any type of wireless device communicating with a radio network node in a cellular or mobile communication system or any device equipped with radio circuitry for wireless communication according to any relevant standard for communication within a cellular or mobile communication system.

As used herein, the non-limiting term "network node" may refer to base stations, network control nodes such as network controllers, radio network controllers, base station controllers, and the like. In particular, the term "base station" may encompass different types of radio base stations including standardized base stations such as Node Bs, or evolved Node Bs, eNBs, and also macro/micro/pico radio base stations, home base stations, also known as femto base stations, relay nodes, repeaters, radio access points, base transceiver stations, BTSs, and even radio control nodes controlling one or more Remote Radio Units, RRUs, or the like.

The network node and the system may also include radio circuitry for communication with one or more other nodes, including transmitting and/or receiving information.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules and/or blocks described herein may be implemented in software such as a computer program for execution by suitable processing circuitry such as one or more processors or processing units.

The proposed technology also provides a computer program 125 comprising instructions, which when executed by at least one processor, cause the processor(s) to:
- read information representing the identity of the wireless device requesting an application to be processed by the local cloud based service, and a representation of an application identity identifying the application;
- select based on the application identity, a Virtual Machine, VM, as the LSC based service provider suitable to process the application for the wireless device;
- construct a traffic filter based on the information representing the identity of the wireless device, the representation of the application identity and a representation of the identity of the selected VM, the traffic filter providing routing of data between the wireless device and the selected VM.

Figure 9:
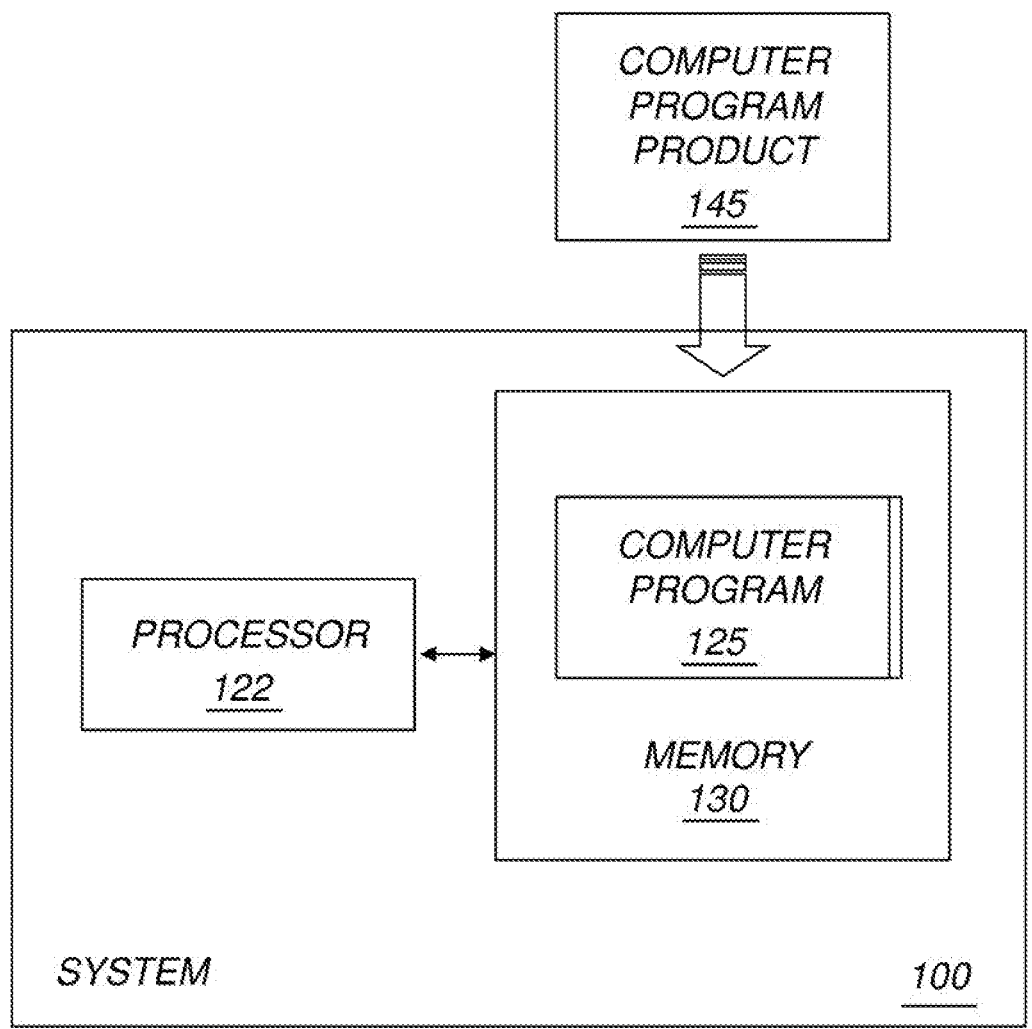
FIG. 9 is a block diagram illustrating an embodiment of a system for constructing a traffic filter together with a computer program product according to the proposed technology.

The use of such a computer program is illustrated schematically in FIG. 9.

By way of example, the software or computer program may be realized as a computer program product, which is normally carried or stored on a computer-readable medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blueray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium 145.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

In this particular example, at least some of the steps, functions, procedures, modules and/or blocks described herein are implemented in a computer program, which is loaded into the memory for execution by processing circuitry including one or more processors. The processor(s) and memory are interconnected to each other to enable normal software execution. An optional input/output device may also be interconnected to the processor(s) and/or the memory to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps, functions, procedure and/or blocks, but may also execute other tasks.

By way of example, the software or computer program may be realized as a computer program product, which is normally carried or stored on a computer-readable medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blueray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The flow diagram or diagrams presented herein may therefore be regarded as a computer flow diagram or diagrams, when performed by one or more processors. A corresponding system or network node may be defined as a group of function modules, where each step performed by the processor corresponds to a function module. In this case, the function modules are implemented as a computer program running on the processor. Hence, the system or network node may alternatively be defined as a group of function modules, where the function modules are implemented as a computer program running on at least one processor.

The proposed technology provides a system 300 for constructing a traffic filter enabling routing of data between a wireless device and a Local Service Cloud, LSC, based service provider providing service(s) and/or application(s) for the wireless device. The system comprises:
- a communicating module 325 for obtaining information representing the identity of the wireless device requesting an application to be processed by the local cloud based service, and a representation of an application identity identifying the application;
- a selecting module 335 for selecting, based on the application identity, a Virtual Machine, VM, as the LSC based service provider suitable to process the application for the wireless device; and
- a constructing module 345 for constructing a traffic filter based on the information representing the identity of the wireless device, the representation of the application identity and a representation of the identity of the selected VM, the traffic filter providing routing of data between the wireless device and the selected VM.

Figure 10:
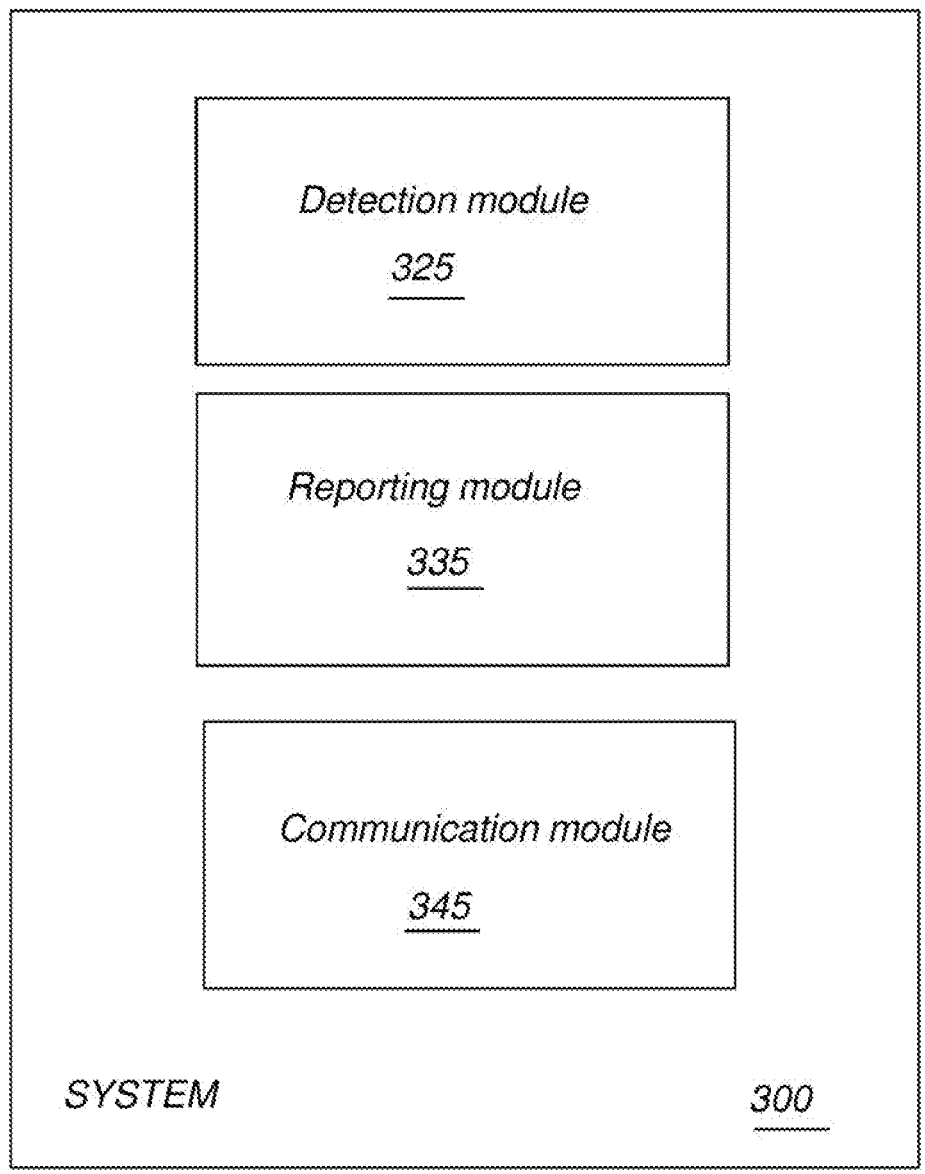
FIG. 10 is a diagram illustrating an embodiment of a system for constructing a traffic filter according to the proposed technology.

The computer program residing in memory may thus be organized as appropriate function modules configured to perform, when executed by the processor, at least part of the steps and/or tasks described herein. An example of such a system is illustrated in FIG. 10.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

What is claimed is:

1. A method of operation by a network node in a wireless communication network, the method comprising:
  detecting a query for an application for which processing in a Local Service Cloud (LSC) is available, the query originating from a wireless device connected to the wireless communication network, and the LSC included in or associated with the wireless communication network; and
  in response to the detection:
  selecting a Virtual Machine (VM) from the LSC, from among one or more VMs that host the application and meet one or more quality-of-service constraints associated with the application;
  configuring a traffic filter targeted to application traffic to be exchanged between the wireless device and the wireless communication network for the application, the traffic filter having the selected VM as the uplink destination and/or downlink source for the application traffic;
  activating a Local Breakout (LBO) function in the wireless communication network, based on linking the traffic filter to a bearer of the wireless communication network that connects to the wireless device for exchanging data-plane traffic; and
  via application of the traffic filter by the LBO, breaking out, as break-out traffic from the bearer, the application traffic flowing on the bearer in the uplink direction from the wireless device and delivering the break-out traffic to the selected VM for local processing, and inserting, as break-in traffic on the bearer, the application traffic going in the downlink direction from the selected VM for the wireless device;
  wherein breaking out the break-out traffic and inserting the break-in traffic comprises performing the break-out and insertion at an interface between a radio part of the bearer and a non-radio part of the bearer, and wherein the bearer comprises an overall connection between the wireless device and a packet gateway of the wireless communication network.

2. The method of claim 1, wherein configuring the traffic filter includes associating the traffic filter to the wireless device via at least one of: an IP address of the wireless device, a Medium Access Control (MAC) address of the wireless device, and an International Mobile Subscriber Identity (IMSI) of the wireless device.

3. The method of claim 1, wherein the one or more quality-of-service constraints include at least one of: limits on packet delay, loss, or latency.

4. The method of claim 1, wherein selecting the VM from the LSC further considers at least one of: security constraints that limit which VMs in the LSC are selectable, or geographical access constraints that limit which VMs in the LSC are selectable.

5. The method of claim 1, wherein selecting the VM from the LSC comprises selecting the VM, from among the available VMs in the LSC, further based on at least one of: routing path optimization, processing cost optimization, or VM prioritization.

6. The method of claim 1, wherein the network node is a radio network node in the wireless communication network that provides the radio part of the bearer.

7. The method of claim 1, wherein detecting the query for the application for which processing in the LSC is available comprises the network node intercepting a Domain Name Server (DNS) query from the wireless device, for the application, directing the DNS query to a local DNS proxy associated with the LSC, and receiving a return response from the local DNS.

8. The method of claim 1, wherein the network node is a radio network node in the wireless communication network, the radio network node having a radio connection to the wireless device and operating as a serving node with respect to the wireless device.

9. A network node configured for operation in a wireless communication network, the network node comprising:
  first communication circuitry configured to communicate directly or indirectly with a wireless device operating in the wireless communication network;
  second communication circuitry configured to communicate with a Local Service Cloud (LSC) included in or associated with the wireless communication network; and
  processing circuitry operatively associated with the first and second communication circuitry and configured to:
  detect a query for an application for which processing in the LSC is available, the query originating from the wireless device; and
  in response to the detection:
  select a Virtual Machine (VM) from the LSC, from among one or more VMs that host the application and meet one or more quality-of-service constraints associated with the application;
  configure a traffic filter targeted to application traffic to be exchanged between the wireless device and the wireless communication network for the application, the traffic filter having the selected VM as the uplink destination and/or downlink source for the application traffic;
  activate a Local Breakout (LBO) function in the wireless communication network, based on linking the traffic filter to a bearer of the wireless communication network that connects to the wireless device for exchanging data-plane traffic; and
  via application of the traffic filter by the LBO, break out, as break-out traffic from the bearer, the application traffic flowing on the bearer in the uplink direction from the wireless device and delivering the break-out traffic to the selected VM for local processing, and insert, as break-in traffic on the bearer, the application traffic going in the downlink direction from the selected VM for the wireless device;
  wherein, to break out the break-out traffic and insert the break-in traffic, the processing circuitry is configured to perform the break-out and insertion at an interface between a radio part of the bearer and a non-radio part of the bearer, and wherein the bearer comprises an overall connection between the wireless device and a packet gateway of the wireless communication network.

10. The network node of claim 9, wherein, to configure the traffic filter, the processing circuitry is configured to associate the traffic filter to the wireless device via at least one of: an IP address of the wireless device, a Medium Access Control (MAC) address of the wireless device, and an International Mobile Subscriber Identity (IMSI) of the wireless device.

11. The network node of claim 9, wherein the one or more quality-of-service constraints include at least one of: limits on packet delay, loss, or latency.

12. The network node of claim 9, wherein, to select the VM from the LSC, the processing circuitry is configured to further consider at least one of: security constraints that limit which VMs in the LSC are selectable, or geographical access constraints that limit which VMs in the LSC are selectable.

13. The network node of claim 9, wherein, to select the VM from the LSC, the processing circuitry is configured further consider at least one of: routing path optimization, processing cost optimization, or VM prioritization.

14. The network node of claim 9, wherein the network node is a radio network node in the wireless communication network that provides the radio part of the bearer.

15. The network node of claim 9, wherein, to detect the query for the application for which processing in the LSC is available, the processing circuitry is configured to intercept a Domain Name Server (DNS) query from the wireless device, for the application, direct the DNS query to a local DNS proxy associated with the LSC, and receive a return response from the local DNS.

16. The network node of claim 9, wherein the network node is a radio network node in the wireless communication network, the radio network node having a radio connection to the wireless device and operating as a serving node with respect to the wireless device.

* * * * *